(12) United States Patent
Neal (10) Patent No.: US 10,257,690 B2
(45) Date of Patent: Apr. 9, 2019

(54) NETWORK SEGMENTATION FOR HOSTING OF ROAMING PARTNER NETWORKS AND SERVICES

(71) Applicant: VODAFONE IP LICENSING LIMITED, Newbury, Berkshire (GB)

(72) Inventor: Adrian Neal, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 15/761,958

(22) PCT Filed: Sep. 21, 2016

(86) PCT No.: PCT/GB2016/052938
§ 371 (c)(1),
(2) Date: Mar. 21, 2018

(87) PCT Pub. No.: WO2017/051172
PCT Pub. Date: Mar. 30, 2017

(65) Prior Publication Data
US 2018/0295498 A1  Oct. 11, 2018

(30) Foreign Application Priority Data
Sep. 22, 2015 (GB) .................................. 1516793.5

(51) Int. Cl.
*H04W 4/00* (2018.01)
*H04W 8/08* (2009.01)
(Continued)

(52) U.S. Cl.
CPC ........ *H04W 8/082* (2013.01); *G06F 9/45558* (2013.01); *H04W 4/24* (2013.01);
(Continued)

(58) Field of Classification Search
CPC ......... H04W 8/06; H04W 8/26; H04W 48/18; H04W 88/06; H04W 92/02; H04W 8/183;
(Continued)

(56) References Cited

U.S. PATENT DOCUMENTS

| 7,778,637 B2 * | 8/2010 | Zhang ..................... H04L 63/10 455/426.1 |
| 2012/0173661 A1 * | 7/2012 | Mahaffey ................ H04L 67/14 709/217 |

(Continued)

FOREIGN PATENT DOCUMENTS

| WO | 2015039699 A1 | 3/2015 |
| WO | 2015126430 A1 | 8/2015 |

OTHER PUBLICATIONS

International Search Report and Written Opinion issued in PCT/GB2016/052938 dated Nov. 30, 2016.
(Continued)

*Primary Examiner* — Danh C Le
(74) *Attorney, Agent, or Firm* — Workman Nydegger (57) ABSTRACT

System and method for providing cellular services to a roaming subscriber comprising a visited public land mobile network, VPLMN. At least one processor within the VPLMN. Memory storing instructions that, when executed by the at least one processor, cause the system to instantiate one or more network functions as software processes performing data plane packet processing within a network functions virtualisation, NFV, environment hosted by the VPLMN and associated with a home public land mobile network, HPLMN, wherein the network functions provide the roaming subscriber with network services associated with the HPLMN.

13 Claims, 11 Drawing Sheets

(51) Int. Cl.
*H04W 8/12* (2009.01)
*H04W 4/24* (2018.01)
*H04W 8/06* (2009.01)
*G06F 9/455* (2018.01)
*H04L 29/06* (2006.01)

(52) U.S. Cl.
CPC ............... *H04W 8/06* (2013.01); *H04W 8/12* (2013.01); *G06F 2009/45595* (2013.01); *H04L 65/1016* (2013.01); *H04M 2215/32* (2013.01)

(58) Field of Classification Search
CPC ........... H04W 8/12; H04W 8/18; H04W 8/04; H04W 60/00; H04B 1/7087
USPC ...... 455/432.1, 432.2, 432.3, 435.1; 370/352
See application file for complete search history.

(56) References Cited

U.S. PATENT DOCUMENTS

| | | | |
|---|---|---|---|
| 2013/0084829 A1* | 4/2013 | De Foy | H04W 12/06 455/411 |
| 2013/0095826 A1 | 4/2013 | Vrbaski et al. | |
| 2013/0252578 A1* | 9/2013 | So | H04M 15/66 455/406 |
| 2014/0038593 A1* | 2/2014 | Kim | H04W 4/08 455/432.3 |
| 2014/0077320 A1 | 3/2014 | Chen et al. | |
| 2014/0241247 A1 | 8/2014 | Kempf et al. | |
| 2015/0109967 A1 | 4/2015 | Hogan et al. | |
| 2015/0119092 A1* | 4/2015 | Yi | H04W 4/70 455/466 |
| 2015/0222550 A1 | 8/2015 | Anand | |
| 2016/0335111 A1* | 11/2016 | Bruun | G06F 9/45558 |
| 2016/0359769 A1* | 12/2016 | Wang | H04L 49/70 |
| 2017/0331720 A1* | 11/2017 | Brissette | H04L 45/04 |

OTHER PUBLICATIONS

Chiosi et al. "Network Functions Virtualisation—Introductory White Paper Issue 1 Network Functions Virtualisation An Introduction, Benefits, Enablers, Challenges & Call for Action Contributing Organisations & Authors" Oct. 22, 2012.

European Search Report issued in GB 1516793.5 dated Feb. 24, 2016.

* cited by examiner

NETWORK SEGMENTATION FOR HOSTING OF ROAMING PARTNER NETWORKS AND SERVICES

CROSS REFERENCE TO RELATED APPLICATIONS

This application is a U.S. Nationalization of PCT Application Number PCT/GB2016/052938, filed on Sep 21, 2016, which claims priority to GB Patent Application No. 1516793.5 filed on Sep 22, 2015, the entireties of which are incorporated herein by reference.

FIELD OF THE INVENTION

The present invention relates to a system and method for improving networking efficiency and improved functionality to subscribers roaming on a visited network.

BACKGROUND OF THE INVENTION

When a subscriber roams from their home network onto a visited network then certain signalling needs to take place before the roaming subscriber can obtain network services including voice, SMS and data services. The visited network can determine that a subscriber is roaming from an IMSI broadcast from their user equipment (UE). The IMSI also provides the visited network with an indication of the identity of the home network of the subscriber and therefore determine if a roaming agreement exists between the two networks. The home network is notified of the roaming subscriber by receiving their IMSI from the visited network. The home network HLS/HSS is updated with this information and the IMSI is also added to the VLR of the visited network. Communications between the visited network and the home network take place using various network interconnects and these are also used to provide services to the subscriber.

Network interconnects are expensive to use and may have limited bandwidth. Such requirements may have large variations over the year but will need to be provisioned to cope with the highest expected demand (e.g. during holiday periods). Furthermore, roaming subscribers usually have limited services available when roaming than when they are on their home network (e.g. limited to voice, data and SMS). Specific home network services (e.g. traffic, weather, banking, multimedia applications, etc.) provided by IP multimedia subsystem, IMS, servers will typically be absent when roaming. Furthermore, the roaming subscriber will not usually be able to use similar services available to subscribers of the visited network.

Accounting data for the services provided by the visited network to the roaming subscriber also needs to be passed between the visited and the home network and reconciled. This may require regular batch file transfers between the network operators.

Figure 1:
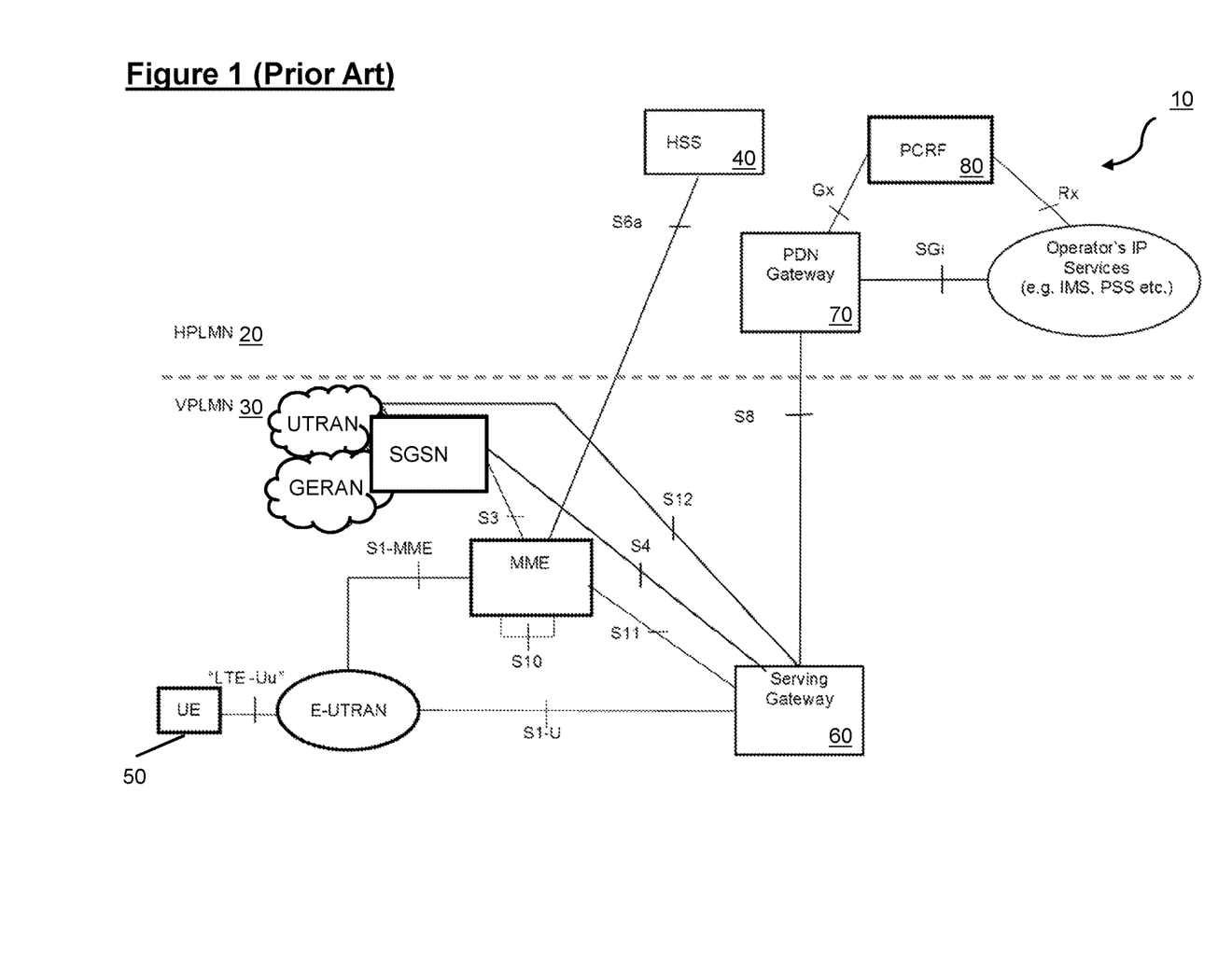
FIG. 1 shows a schematic diagram of an existing telecommunications system used when a subscriber roams.

FIG. 1 illustrates schematically a system 10 for providing services to a UE 50 that is roaming. The subscriber using the UE 50 has a home public land mobile network (HPLMN) 20 and is roaming on to a visited public land mobile network (VPLMN) 30. The HPLMN 20 has a home subscriber server (HSS) 40 that contains a home location register (HLR). When the UE 50 registers with the VPLMN 30 then the HPLMN 20 is notified of the subscriber. The subscriber identity is recorded in the HLR. Activity and services provided to the UE 50 are reported to the HPLMN 20. Roaming traffic from the UE 50 traverses back to the HPLMN 20 using a serving gateway 60 on the VPLMN 30 communicating with packet data network (PDN) gateway 70 within the HPLMN 20. The VPLMN 30 records call, SMS and data volumes supplied to each subscriber whilst roaming and these are reported to the HPLMN 20.

Figure 1A:
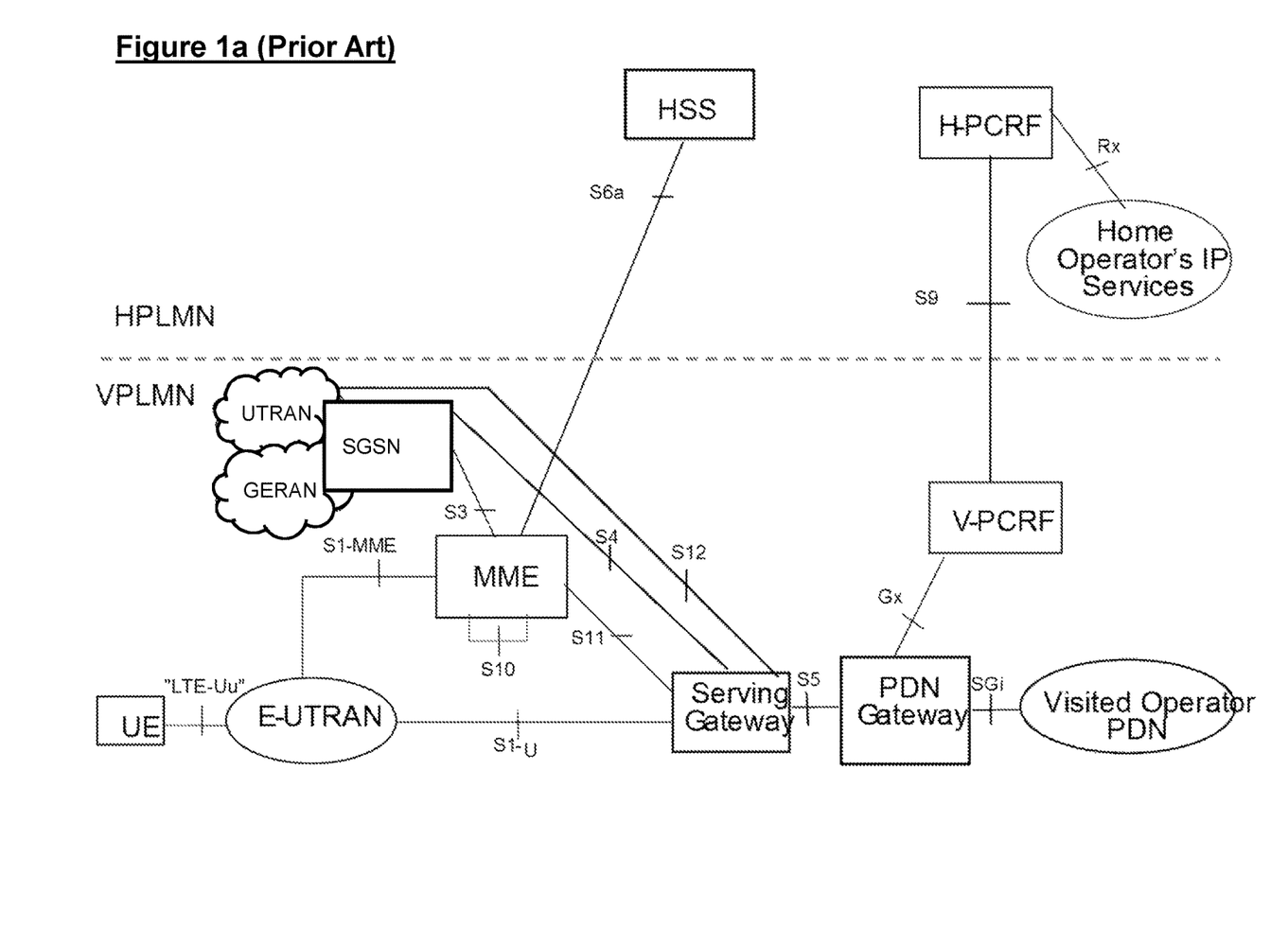
FIG. 1a shows a schematic diagram of a further existing telecommunications system used when a subscriber roams.
Figure 2:
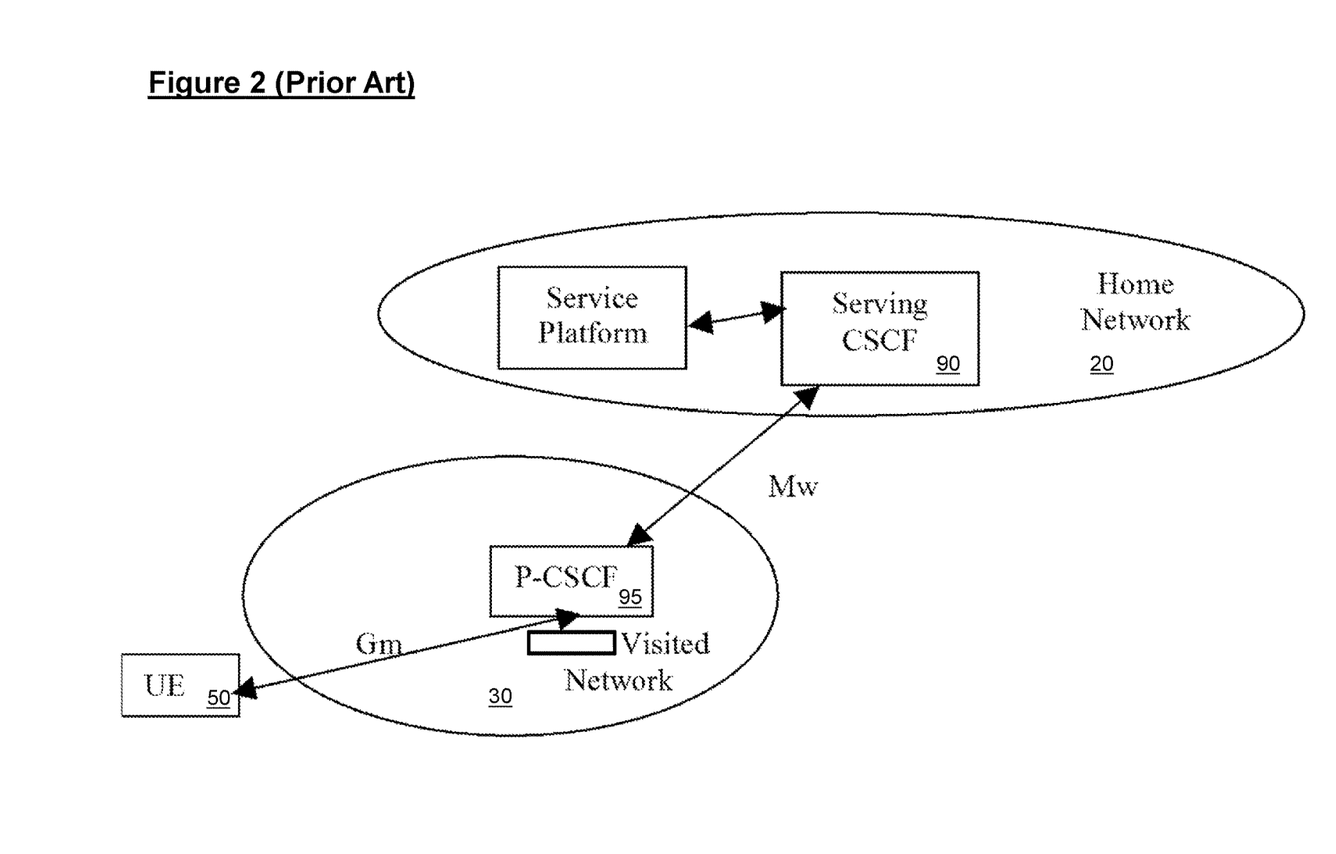
FIG. 2 shows a schematic diagram of a further aspect of the existing telecommunications system of FIG. 1.

FIG. 1a shows schematically current roaming procedures where Local Breakout is being implemented. FIG. 2 shows a further high-level schematic diagram of current certain aspects of roaming telecommunications systems. In particular, a call session control function (CSCF) 90 is shown within the home network 20. A proxy-CSCF 95 is shown within the visited network 30 and in communication with the CSCF 90. Such arrangements limit services provided to roaming subscribers and have high overheads. Therefore, there is required a method and system that overcomes these problems.

SUMMARY OF THE INVENTION

Cloud computing techniques allow telecoms network operators to host and manage I.T. services and applications on lower cost common off the shelf (COTS) hardware. For example, vertical slices may be created through datacentre architecture, which may host third party services.

Network functions virtualisation (NFV) is under development and is currently being standardised in ETSI. This extends cloud hosting to telecom network functions such as virtualised 3GPP network elements like EPC and its components (S-GW, P-GW, MME), packet switched core and policy control functions (GGSN, SGSN, PCRF, TDF) and middle boxes situated after the Gi interface (firewalls, content filters, video optimisers etc.; the so-called GiLAN).

Software defined networking (SDN) is also being standardised in the Open Networking Forum and IETF as well as other bodies. SDN allows an operator to program and automate routeing and forwarding paths and create "Service Chains" for each by separating control of both from switching infrastructure, which acts on the instructions from the controller. So far this has only been standardised at the Network layer (Layer 3) in the OSI 7 Layer model. A proposal for Layer 4 to Layer 7 routeing and forwarding is being progressed in the ONF and a proof of concept for it is being worked in ETSI ISG NFV.

Putting cloud computing, NFV and SDN together allows operators to create virtual slices through their datacentres and to operate separate, individually scalable, bespoke networks from Layer 2 right up to Layer 7 (Application layer).

Network functions virtualisation (NFV) applies IT virtualisation technologies to network services. For a description of example NFV environments that may be used see https://portal.etsi.org/NFV/NFV_White_Paper.pdf (accessed 17 Sep. 2015) and https://portal.etsi.org/tb.aspx?tbid=789&SubTB=789,795,796,801,800,798,799,797,802 (accessed 17 Sep. 2015).

It has been suggested that entire mobile virtual network operator (MVNO) networks may be implemented within a NFV environment hosted by another operator and offered as a Network as a Service offering https://www.sdxcentral.com/articles/contributed/how-nfv-change-mvno-business-1/2014/06/, http://www.mvnodynamics.com/2014/10/24/meet-phantom-network-nfv/ (accessed 17 Sep. 2015). The MVNO may be hosted within a slice of the hosting operator's datacentre fabric, for example.

There has never been any suggestion of a visited network hosting any functions of a home network for use by roaming subscribers. Furthermore, the procedures and functions allowing subscribers to roam continue to be based on a model in which services (usually limited to voice, SMS and data) are provided by the visited network. In contrast to this well established model, the present invention requires an instance of a roaming partner (i.e. home network) to be hosted by a hosting network (i.e. a visited network). The hosted network functions are provided within an NFV hosted instance of the roaming partner's network and may contain any or all of the network functions and services offered by the home network.

When user equipment (UE) of a subscriber of the home network roams onto the visited network then services are provided to the subscriber by the NFV hosted instance of the roaming partner. In some examples, this process may appear to the subscriber as a typical roaming experience (i.e. the visited network is displayed as the network provider). In other examples, the home network may appear as the network provider even though the physical infrastructure providing the network services is that of the visited network (i.e. similar to a MVNO experience without roaming). In any case, the subscriber may be provided with any or all of their additional services (i.e. above calls, SMS and data) that they enjoy when physically within their home network.

Billing and other administrative functions may also be hosted within the NFV hosted instance of the roaming partner so that communications between the home and visited networks (e.g. over international interconnect points) can be reduced and simplified. Synchronisation between the NFV hosted instance of the roaming partner and the physical roaming partner infrastructure can be implemented using various techniques (e.g. real-time updates, batch updates or file-based synchronisation). Even if only basic services are provided then advantages and benefits may arise in terms of signalling simplification and lower usage of interconnects.

According to a first aspect there is provided a system for providing cellular services to a roaming subscriber comprising:
  a visited public land mobile network, VPLMN;
  at least one processor within the VPLMN; and
  memory storing instructions that, when executed by the at least one processor, cause the system to:
  instantiate one or more network functions as software processes performing data plane packet processing within a network functions virtualisation, NFV, environment hosted by the VPLMN and associated with a home public land mobile network, HPLMN, wherein the network functions provide the roaming subscriber with network services associated with and/or provided by the HPLMN. Therefore, communications between the visited network and the home network can be reduced and/or simplified. Furthermore, more enhanced telecommunications services may be provided to subscribers when roaming. There may be one hosted environment providing telecommunications services for each of one or more home networks. Multiple and separate NFV environments, each associated with a different home network or roaming partner may be hosted by the visited network of the HPLMN.

Optionally, the HPLMN may be provided with an indication that the subscriber is roaming on the VPLMN.

Optionally the instructions may further record the roaming subscriber on a visited location register, VLR, within the VPLMN.

Preferably, the NFV environment hosted by the VPLMN may include one or more IP multimedia subsystem, IMS, servers configured to provide the subscriber with one or more services. These IMSs may provide additional services similar to those available when the subscriber is within the home network but not typically available when roaming.

Preferably, the one or more services may correspond with services provided by the HPLMN when the subscriber is within the geographical area of the HPLMN.

Advantageously, the NFV environment hosted by the VPLMN may include a policy and charging rules function, PCRF, of the HPLMN. This allows the HPLMN policy rules to be applied to its roaming subscribers, simplifies charging the home network for services provided by the visited network and can also help to reduce or simplify communications between the two networks.

Preferably, the PCRF within the VPLMN's NFV environment may be configured to synchronise with a PCRF within the HPLMN.

Optionally, the NFV environment may include a packet data network, PDN.

In accordance with a second aspect there is provided a method for providing cellular services to a roaming subscriber outside of a home public land mobile network, HPLMN, from a visited public land mobile network, VPLMN, the method comprising the steps of:
  instantiating one or more network functions as software processes performing data plane packet processing within a network functions virtualisation, NFV, environment hosted by the VPLMN and associated with the HPLMN, wherein the network functions provide the roaming subscriber with network services associated with the HPLMN; and optionally providing the home network with an indication that the subscriber is roaming on the visited network.

Preferably, the method may further comprise the step of recording a subscriber of a home network on a visited location register (VLR) within the VPLMN. A home location register (HLR) may also be updated within the HPLMN.

Preferably, the provided home network services are provided by a packet data network, PDN, via a PDN gateway within the NFV environment hosted by the VPLMN. This further reduces traffic over the international interconnect as such a PDN is usually located within the HPLMN.

Preferably, the method may further comprise the step of the VPLMN providing the HPLMN with an indication of the usage of network services provided to the roaming subscriber. This can be achieved by various methods, either batched (e.g. during quite or low traffic times) or in real time.

Optionally, the indication of the network services or application of home network policy rules is provided to the roaming subscriber by a policy and charging rules function, PCRF, within the NFV environment. Therefore, home network policies for services are provided by the PCRF within the same area of the visited network's NFV environment.

Optionally, the indication of the usage of network services provided to the roaming subscriber may be sent to the HPLMN as either:
  online charging records and call detail records, CDR; or
  as a GSMA TAP3 file. Other formats may be used. The records or files may be sent at intervals or when other criteria are reached. Preferably, the records or files are sent during quiet periods or at times of low traffic. The indication of the network services may be accounting data indicating usage.

Optionally, the NFV environment may host one or more network functions or services selected from the group comprising: subscription profile repository, SPR; online charging system, OCS; and offline charging system, OFCS. Other network functions or services may be hosted.

Optionally, the method may further comprise synchronising any one or more of the SPR, OCS, and/or OFCS within the NFV environment (hosted by the VPLMN) with a corresponding network function or service within the subscriber's HPLMN. Synchronisation traffic may be in either or both directions.

Preferably, the network function virtualisation, NFV, environment is one of a plurality of network slices operating on the same infrastructure. Therefore, more than one roaming partner may take advantage of these enhanced services. Multiple roaming agreements may exist and so a network may host many virtual instances of different visited networks.

Optionally, the method may further comprise the step of adding or removing resources to or from the NFV environment as subscriber demand for their home network services rises or falls. This provides improved scalability.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Cloud computing techniques allow telecoms network operators to host and manage I.T. services and applications on lower cost common off the shelf (COTS) hardware. For, example, vertical slices may be created through datacentre architecture, which may host third party services.

Network functions virtualisation (NFV) is under development and is currently being standardised in ETSI. This extends cloud hosting to telecom network functions such as virtualised 3GPP network elements like EPC and its components (S-GW, P-GW, MME), packet switched core and policy control functions (GGSN, SGSN, PCRF, TDF) and middle boxes situated after the Gi interface (firewalls, content filters, video optimisers etc.; the so-called GiLAN).

Software defined networking (SDN) is also being standardised in the Open Networking Forum and IETF as well as other bodies. SDN allows an operator to program and automate routeing and forwarding paths and create "Service Chains" for each by separating control of both from switching infrastructure, which acts on the instructions from the controller. So far this has only been standardised at the Network layer (Layer 3) in the OSI 7 Layer model. A proposal for Layer 4 to Layer 7 routeing and forwarding is being progressed in the ONF and a proof of concept for it is being worked in ETSI ISG NFV.

Putting cloud computing, NFV and SDN together allows operators to create virtual slices through their datacentres and to operate separate, individually scalable, bespoke networks from Layer 2 right up to Layer 7 (Application layer). It has been proposed to host mobile virtual network operator (MVNOs) in this way, for example. However, in the current disclosure, instead of using these techniques to host MVNOs, it has been realised that advantages may also be achieved if the virtual slices through the network architecture are used to host instances of one or more roaming partners' networks.

Figure 3:
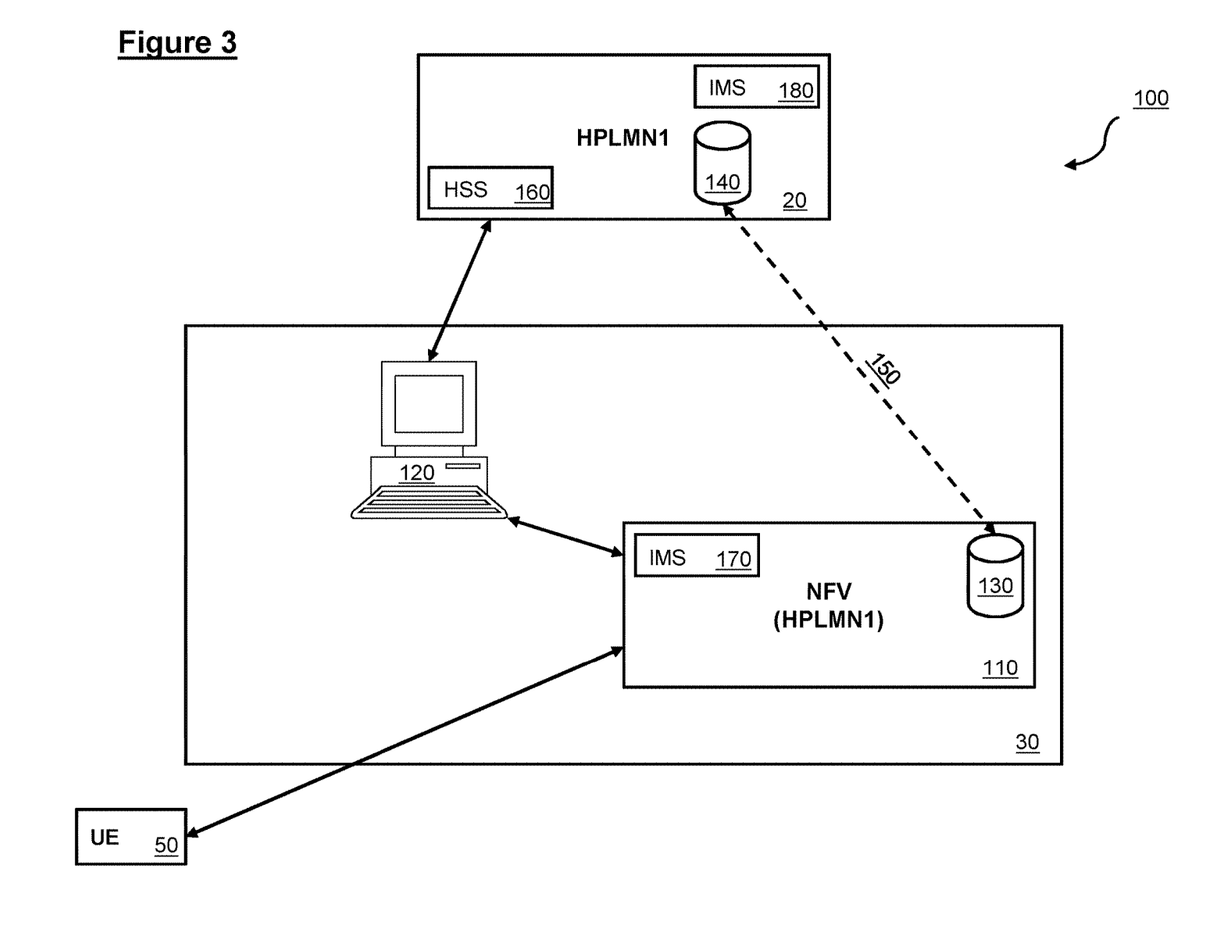
FIG. 3 shows a schematic diagram of a new telecommunications system used when a subscriber roams.

FIG. 3 illustrates schematically and at a high level a system 100 for providing user equipment (UE) 50 of a subscriber with telecommunications services when roaming onto a visited network 30. The home network or home public land mobile network (HPLMN) 20 does not require any changes (but these may be included, nevertheless) and can be informed that the subscriber is roaming by the visited network 30 in the usual way. A network functions virtualisation (NFV) environment 110 is hosted by the visited network 30. Control functionality 120 within the visited network 30 maintains and monitors the NVF 110 and provides updates to the home network 20 so that entries can be in the home location register (HLR) within the home subscriber server (HSS) 160 of the home network 20.

The NFV 110 associated with the home network (HPLMN1) contains many or all of the functions and data available from within the home network 20 to the subscriber. In order to keep these data and functionality aligned, then they may be synchronised at intervals or in real time. In the example shown in FIG. 3, these data are illustrated by database 130 within the NFV 110 and database 140 within the home network 20. Synchronisation is indicated by dashed arrow 150 between these two databases. Furthermore, corresponding IP multimedia subsystems (IMS) 170 and 180 exist within the NFV 110 and home network 20, respectively. The IMS system 170 within the NFV environment 110 provides specific services to the subscriber of the UE 50 when roaming. When the UE 50 of the subscriber is within the home network, then IMS 180 provides substantially similar or identical services to the subscriber (e.g. functionality and/or the home language).

The invention describes virtual Layer 2 to Layer 7 slices through a hosting telecom operator's datacentre or other hosting environment, upon which a portion of a roaming partner's services, which have been agreed between the hosting and hosted operators, are hosted. This portion can be separately managed by the hosting operator as a specific and dedicated slice of their network infrastructure. Network management or other analytics information may be gathered on a per slice basis, recording actual hardware usage and software network and service application usage, thereby simplifying network capacity planning and SLA reporting. In accordance with concepts of Cloud Computing and Network Function Virtualisation, the size of these slices may be scaled according to demand from inbound roamers belonging to each specific roaming partner.

The inbound roamers may then be able to receive their home network services from the hosting network operator in the visited country as if they were attached to their home network in their home country. This may depend on the particular level of services supported by the reciprocal roaming/hosting agreements between the hosting operator and its roaming partner network operator. Charging information may be collected by the hosting operator and either rated by the hosting operator via virtualised charging applications using home operator tariffs applied by the hosting operator. Alternatively, aggregated usage information may be transferred between the operators via GSMA TAP3 (or other) files as with current arrangements.

The volume of control plane signalling and user/data plane service traffic passing across roaming interfaces may be reduced. Almost all control plane and user/data plane traffic may originate from the hosting (visited) operator's network slice and radio interface(s). Authentication and terminal location traffic from the VLR in the hosting (visited) network to and from the HLR/HSS in the home network may be conducted in real-time but otherwise such requirements may be reduced. Benefits to the subscriber include improved user experience due to applications being hosted locally, access to a larger range of home network services substantially or identically as done when not roaming, the opportunity for reduced roaming charges, and provision of services in their native language. Benefits to the operator include reduced interconnect costs (and required capacity), tailored inter-operator billing per roaming partner, and more accurate capacity planning for each roaming partner's inbound roaming subscriber demand.

Figure 3A:
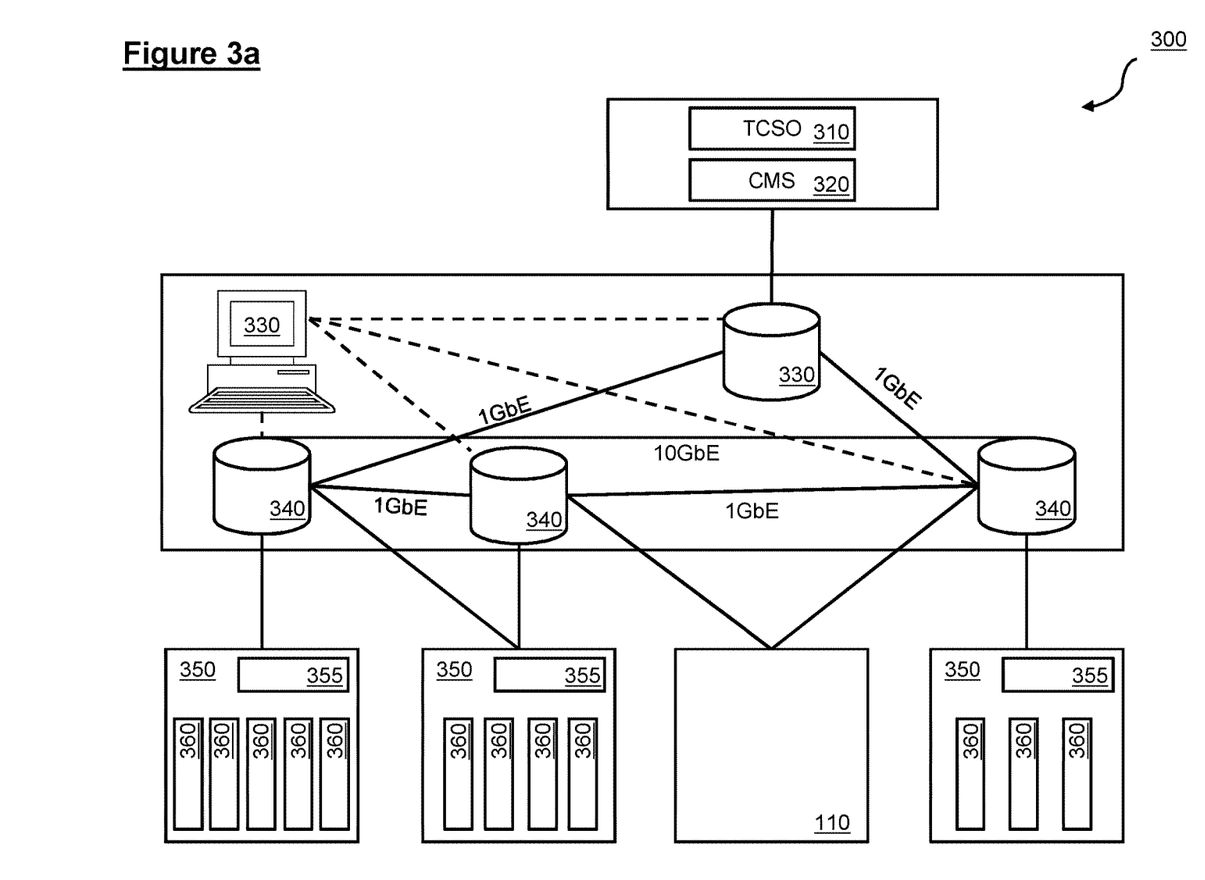
FIG. 3a shows a further schematic diagram of the new telecommunications system of FIG. 3.

FIG. 3a illustrates schematically example architecture 300 to implement and manage this functionality. Subscribers' home network serving CSCF and service platforms are hosted in the visited network as virtual network functions in a network slice on the visited network's infrastructure/hardware. A telco cloud service orchestrator (TCSO) 310 and cloud management system (CMS) 320 may provide overall management of the system. A software defined networking (SDN) controller 330 manages and scales individual data switches 330, 340, which in turn communicate with each other and particular physical components 350 (racks, servers 360, databases, communication interfaces 355, etc.) within one or more datacentres. The NFVs 110 associated with each roaming partner are instantiated within or across the datacentre components 350.

Figure 4:
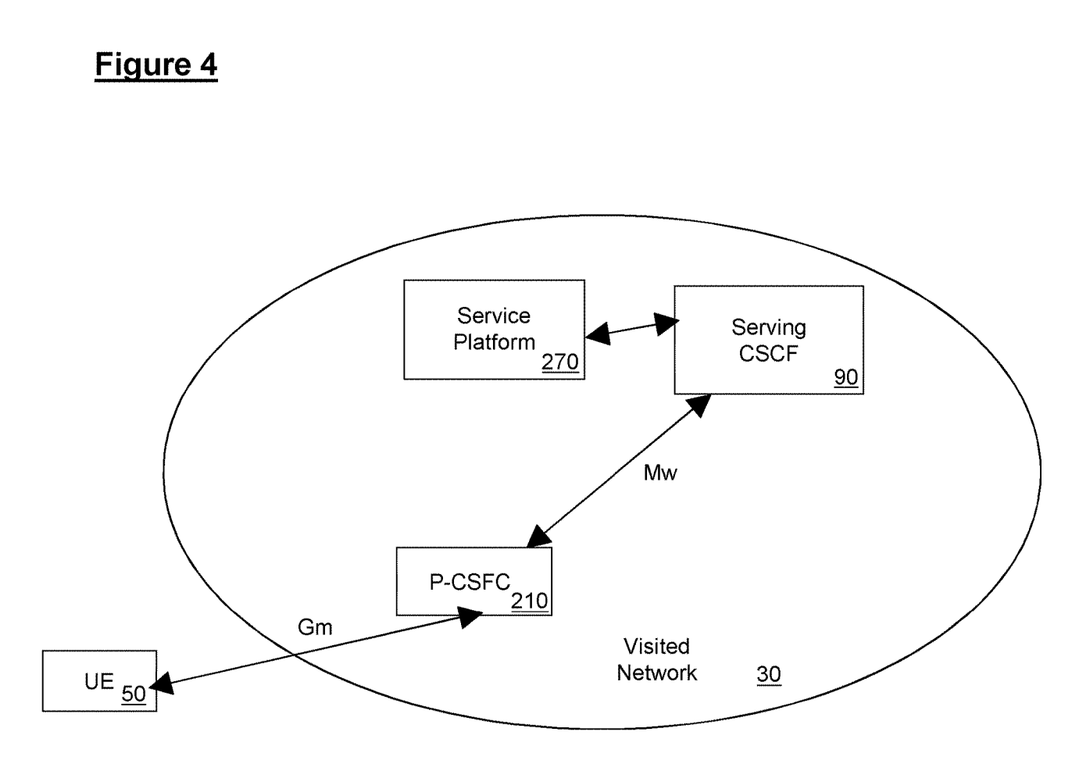
FIG. 4 shows a schematic diagram of some aspect of the architecture of the new telecommunications system of FIG. 3.

FIG. 4 shows a schematic diagram of further example aspects of the architecture 300 implemented within the visited network 30. Subscribers' home network policy and charging rules function (PCRF) 210, IP service platform(s) 270 and/or PDN are hosted in the visited network 30 as virtual network functions in a network slice on the visited network's infrastructure/hardware.

Figure 5:
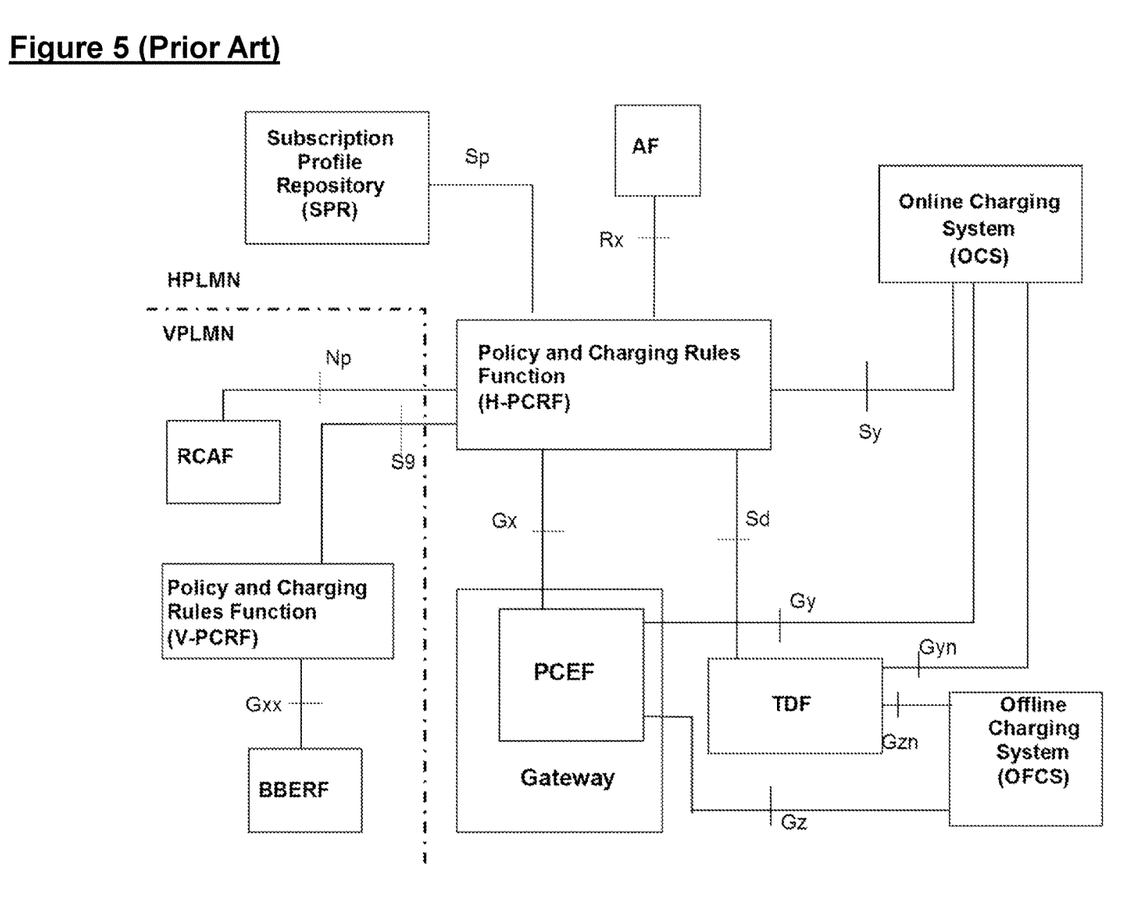
FIG. 5 shows a schematic diagram of policy and charging rules functionality within existing telecommunications systems when a subscriber roams.
Figure 6:
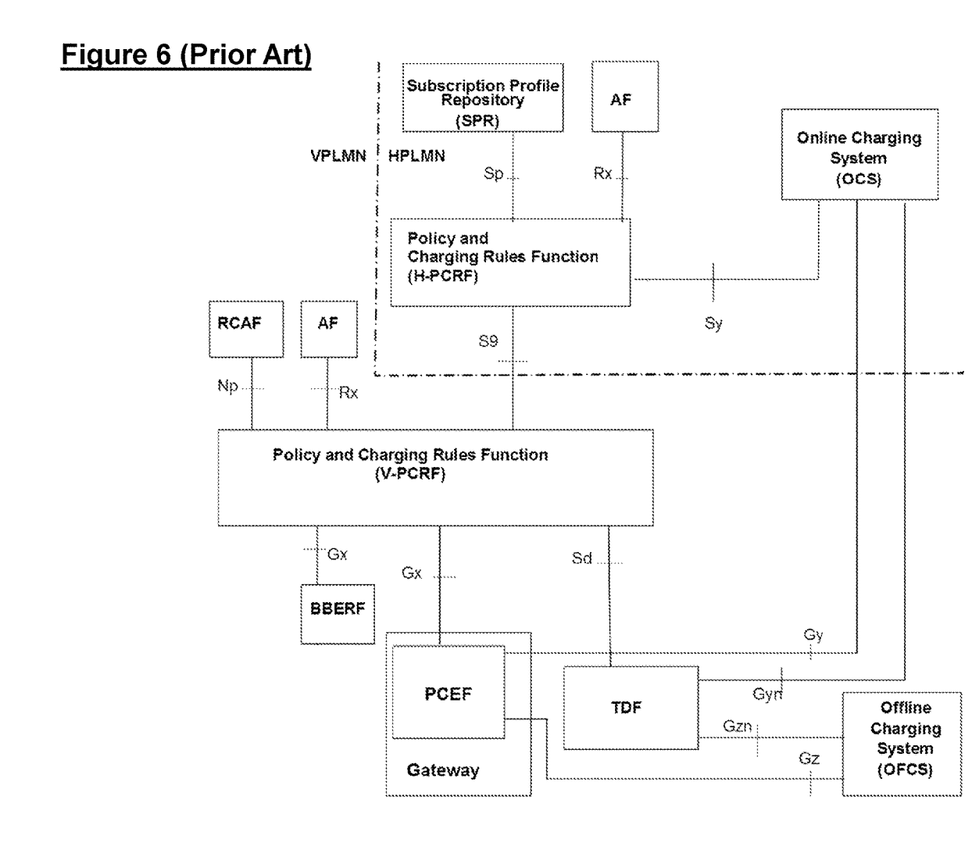
FIG. 6 shows a schematic diagram of policy and charging rules functionality of existing telecommunications systems when a subscriber roams.

FIG. 5 shows how current PCRF is implemented when a subscriber roams. In particular, FIG. 5 shows when PCRF components are allocated between a home network and a visited network. FIG. 6 shows how current PCRF is implemented when a subscriber roams when Local Breakout is implemented in current systems. It is clear from FIGS. 5 and 6 that significant communication volumes are required between the home and visited networks and that these volumes are handled by international interconnects.

Figure 7:
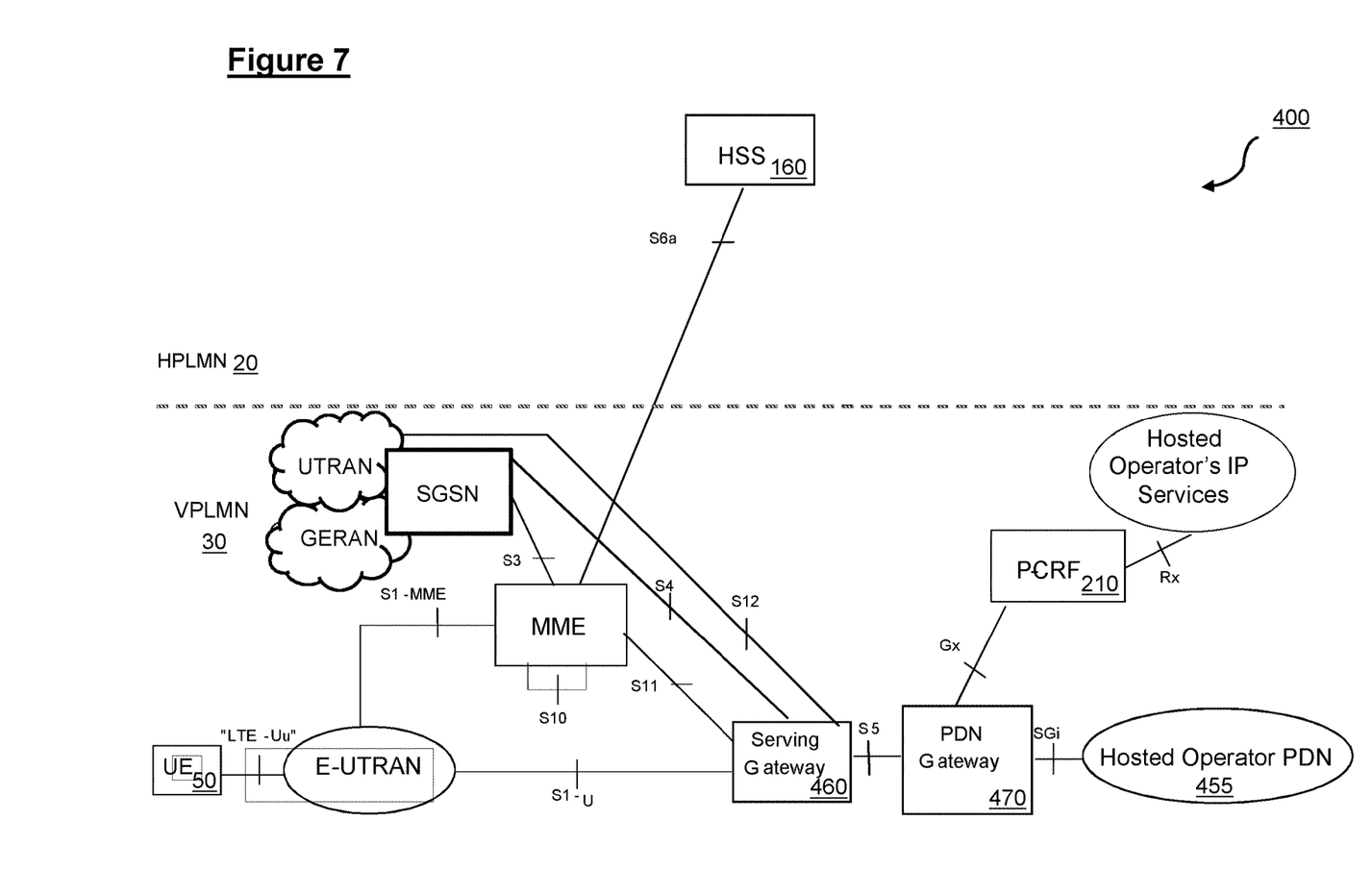
FIG. 7 shows a schematic diagram of further aspects of the telecommunications system of FIG. 3.

FIG. 7 shows a schematic diagram further illustrating the architecture 400 of an example implementation. In particular, FIG. 7 illustrates which network functions are hosted by the visited network 30 within a NFV 110. The HSS 160 hold the HLR within the home network 20. This may be updated with the subscribers' detail in the usual way. As previously mentioned, the PCRF 210 is hosted within the NFV 110 as are other hosted operator IP services (so that the subscriber may enjoy their home network IP services when roaming). The hosted (home) network has its own packet data network (PDN) 455 within the network slice on the visited network 30. A PDN gateway 470 is in communication with the PDN 455 and the PCRF 210 and interfaces with a serving gateway 460 to provide services to the UE 50 and to account for these provided services.

Figure 8:
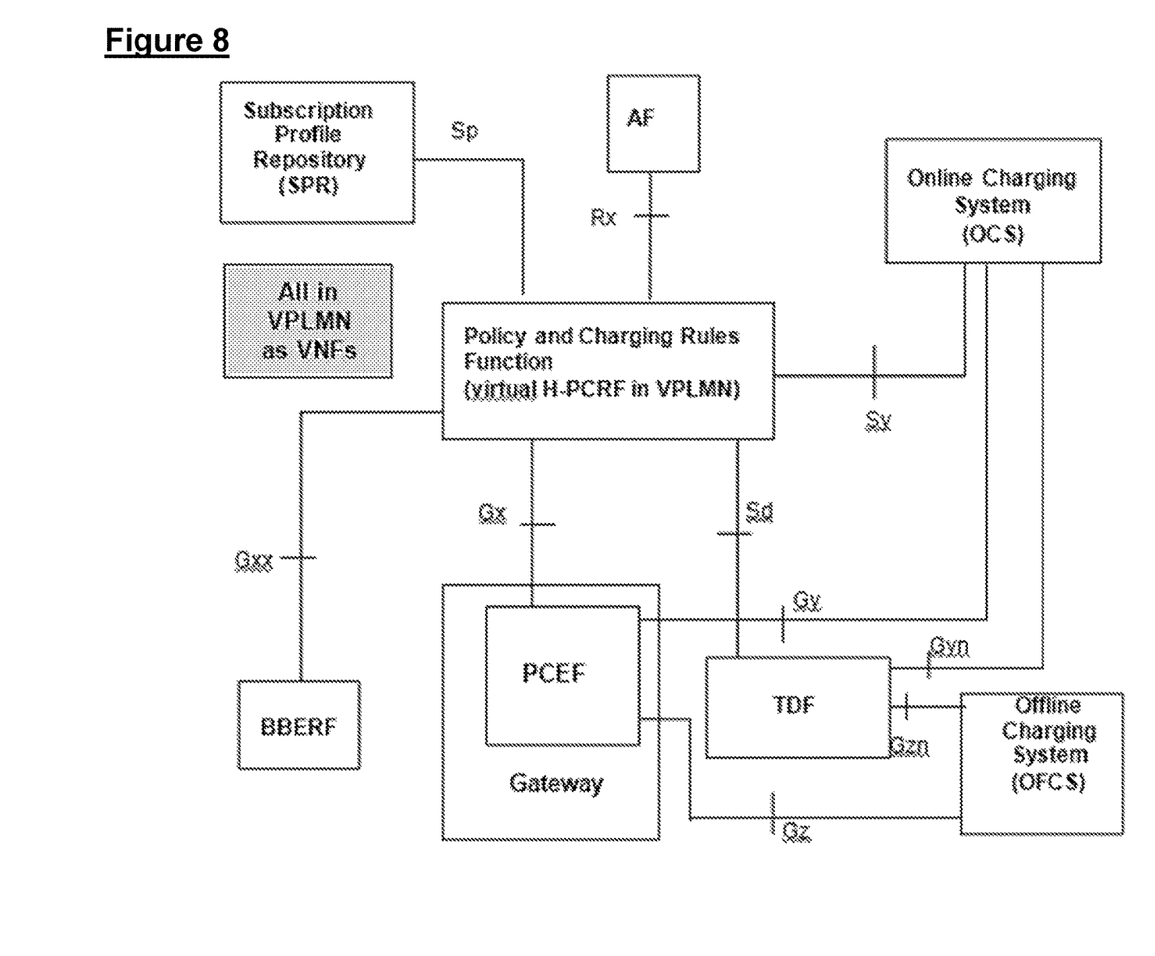
FIG. 8 shows policy and charging rules functionality of the new telecommunications system of FIG. 3.

Subscribers' home network PCRF, TDF, BBERF, SPR, AFs, PCEF Charging Gateway, OCS and OFC-S are hosted in the visited network 30 (VPLMN) as virtual network functions in a network slice on the VPLMNs infrastructure/hardware. An example arrangement of this IMS roaming architecture is shown in FIG. 8.

Therefore, the concepts of home routed or local breakout traffic models are replaced by hosting the subscriber's home network services on the visited network's infrastructure.

The entire Policy Control and Charging architecture, including online and offline charging (CDR) systems may also be hosted in the visited network as virtual network functions. Charging reconciliation between the operators may be done by exchange of online charging records and CDRs directly between the home and visited network operators or by the visited network operator converting the records to GSMA TAP3 files for interoperator billing. These may be sent to the home network operator instead (as happens today).

Figure 9:
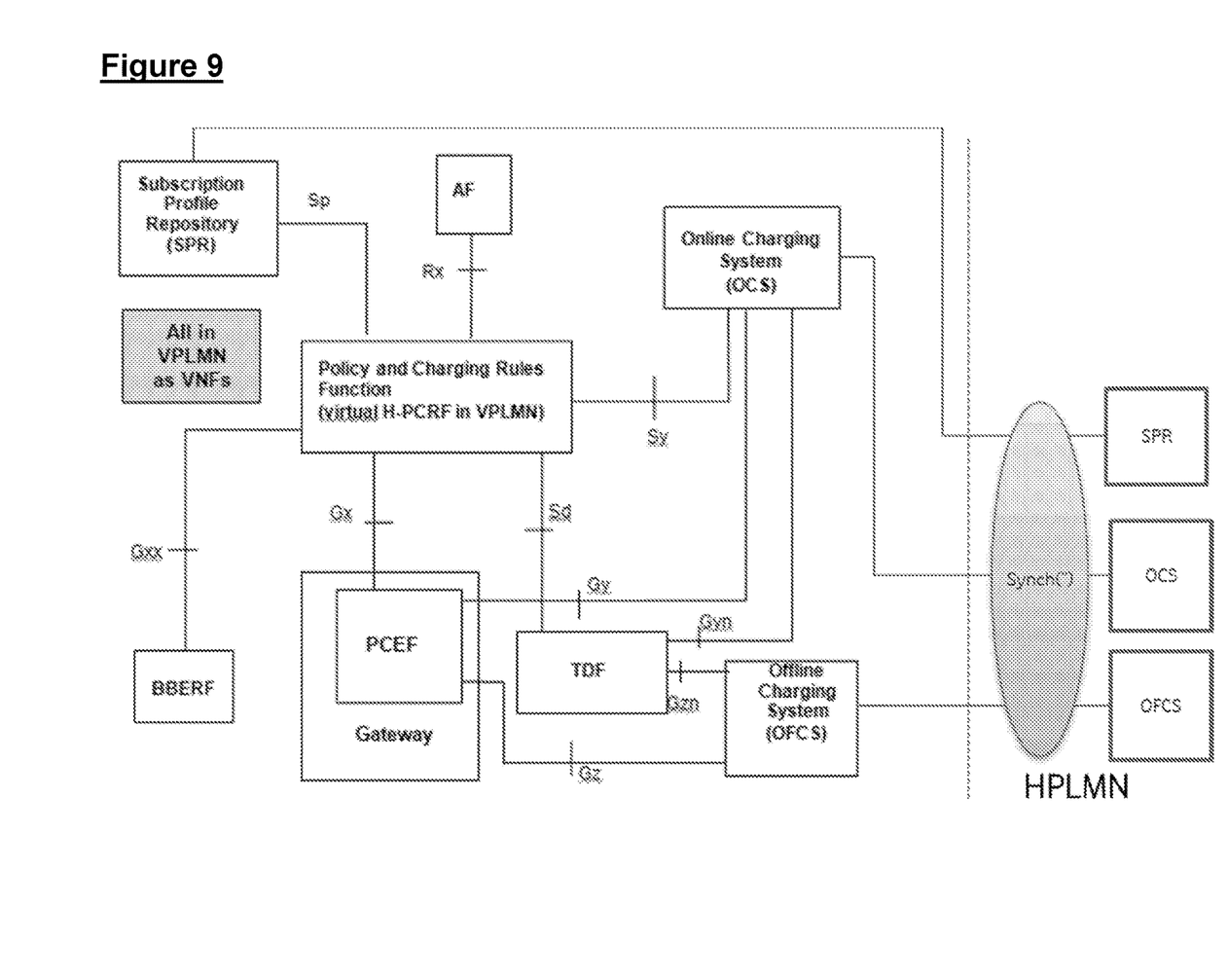
FIG. 9 shows further aspects of the policy and charging rules functionality of FIG. 8.

Further synchronisation between the hosted virtual functions, reporting services and accounting tasks (e.g. PCRF) associated with each roaming partner and the home networks of each roaming partner may be required. This may be achieved using several different mechanisms. FIG. 9 illustrates an example architecture developed to achieve this.

The synch interfaces are not necessarily Layer 2 3GPP interfaces like the rest of the interfaces in the remaining diagrams, but may be achieved within higher layers (at application/web services level so http/SOAP or taking file transfers via ftp, for example). In each case there may be lookup data in databases that need to be synchronised with the master copies in the HPLMN 20. For SPR data, this may be subscription data about services subscribed to (e.g. QoS profiles etc.). For OCS this may be quota information/bundle data and subscribed tariffs. For OFCS these data may be tariffs to be applied to accounting data. When these are located in the VPLMN 30 then the two operators may need to agree to keep their mutual data in each other's network up to date. A typical mechanism could be to share APIs to each other's functions so that the HPLMN 20 may update all remote copies in the VPLMN 30 when they make the updates to their master copies in the HPLMN 20. Alternatively, the files may be transferred to the VPLMN 30 by ftp file transfer for the VPLMN to update manually.

A complication may occur when the update takes place whilst one or more subscribers are in an active session. To avoid or minimise complexity then the updates may be scheduled for quieter hours (e.g. around 3-4 a.m.) in order to lessen the impact of that effect. Therefore, the HPLMN 30 may need to schedule for the same period (e.g. 3-4 a.m.) VPLMN time.

An alternative could be for the VPLMN 20 to signal to the HPLMN 30 at session start to check for any updates to the SPR/OCS/OFCS databases (or others) and to pull the relevant information into the VPLMN copies. This could be done via a VLR query to the HLR/HSS (it typically queries the HLR/HSS in the HPLMN at session setup, to update the HLR/HSSs location record for the UE 50). The HLR/HSS copy of the subscription record for the subscriber should have tariff and bundle information but not necessarily a quota. Therefore the HLR/HSS in the HPLMN 20 may be checked for subscription and/or charging updates since the last time a UE 50 query came to it and to initiate transfer of the updated file(s) to the VPLMN(s) 20. However, this increases signalling and is therefore a less preferred solution.

As will be appreciated by the skilled person, details of the above embodiment may be varied without departing from the scope of the present invention, as defined by the appended claims.

For example, a plurality of hosted virtual networks may be instantiated where each instance is associated with a different roaming partner. Processing and data resources available to each instance may be allocated or varied dynamically according to demand or set according to predefined parameters. Furthermore, each separate instance may be started or stopped as required to make more optimal use of the overall infrastructure. There may also be a mixture of roaming and MVNO instances. In a further example there may be roaming virtual network hosted instance as well as a MNVO hosted instance for the same partner. Furthermore, each network may have separate hosted environments within more than one overseas network operator. In some arrangements, both partners may act as a host and a hosted virtual network (i.e. a reciprocal arrangement).

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A system for providing cellular services to a roaming subscriber comprising:
a visited public land mobile network (VPLMN);
at least one processor within the VPLMN; and
memory storing instructions that, when executed by the at least one processor, cause the system to:
instantiate one or more network functions as processes performing data plane packet processing within a network functions virtualization (NFV) environment hosted by the VPLMN and associated with a home public land mobile network (HPLMN) wherein the network functions provide the roaming subscriber with network services associated with the HPLMN,
wherein the NFV environment hosted by the VPLMN includes a policy and charging rules function (PCRF) of the HPLMN, and
wherein the PCRF within the NFV environment is configured to synchronize with a PCRF within the HPLMN.

2. The system of claim 1, wherein the instructions further cause the at least one processor to record the roaming subscriber on a visited location register (VLR) within the VPLMN.

3. The system of claim 1, wherein the NFV environment hosted by the VPLMN includes one or more IP multimedia subsystem (IMS) server configured to provide the subscriber with one or more services.

4. The system of claim 3, wherein the one or more services correspond with services provided by the HPLMN when the subscriber is within the geographical area of the HPLMN.

5. The system of claim 1, wherein the NFV environment includes a packet data network (PDN).

6. A method for providing cellular services to a roaming subscriber outside of a home public land mobile network (HPLMN) from a visited public land mobile network (VPLMN) the method comprising the steps of:
instantiating one or more network functions as processes performing data plane packet processing within a network functions virtualization (NFV) environment hosted by the VPLMN and associated with the HPLMN, wherein the network functions provide the roaming subscriber with network services associated with the HPLMN, and wherein the NFV environment hosts one or more network functions selected from the group comprising: subscription profile repository (SPR); online charging system (OCS), and offline charging system (OFCS), and
synchronizing any one or more of the SPR, OCS, and/or OFCS within the NFV environment with a corresponding network function within the HPLMN.

7. The method of claim 6 further comprising the step of recording a subscriber of a home network on a visited location register (VLR) within the VPLMN.

8. The method of claim 6, wherein the provided home network services are provided by a packet data network within the NFV environment.

9. The method of claim 6 further comprising the step of the VPLMN providing the HPLMN with an indication of the usage of network services provided to the roaming subscriber.

10. The method of claim 9, wherein the indication of the network services or application of home network policy rules is provided to the roaming subscriber by a policy and charging rules function (PCRF) within the VPLMN's NFV environment.

11. The method of claim 9, wherein the indication of the usage of network services provided to the roaming subscriber is sent to the HPLMN as either:
online charging records and call detail records (CDR); or
as a GSMA TAP3 file.

12. The method of claim 6, wherein the NFV environment is one of a plurality of network slices operating on the same infrastructure.

13. The method of claim 6, further comprising the step of adding or removing resources to the NFV environment as further or fewer roaming subscribers are provided with home network services, respectively.

\* \* \* \* \*